US008874850B1

(12) United States Patent
Goodson et al.

(10) Patent No.: US 8,874,850 B1
(45) Date of Patent: Oct. 28, 2014

(54) HIERARCHICALLY TAGGED CACHE

(75) Inventors: Garth Goodson, Fremont, CA (US);
Minglong Shao, San Jose, CA (US);
Keith Smith, Cambridge, MA (US)

(73) Assignee: NetApp, Inc., Sunnyvale, CA (US)

( * ) Notice: Subject to any disclaimer, the term of this patent is extended or adjusted under 35 U.S.C. 154(b) by 190 days.

(21) Appl. No.: 13/468,798

(22) Filed: May 10, 2012

(51) Int. Cl.
*G06F 12/00* (2006.01)
(52) U.S. Cl.
USPC .......................................... 711/133
(58) Field of Classification Search
CPC ............................. G06F 12/121; G06F 12/122
USPC .......................................................... 711/133
See application file for complete search history.

(56) References Cited

U.S. PATENT DOCUMENTS

| 2004/0186946 | A1* | 9/2004 | Lee ................................ 711/103 |
| 2009/0037495 | A1* | 2/2009 | Kumar et al. .................. 707/204 |
| 2009/0192645 | A1* | 7/2009 | Govindaraj et al. ........... 700/110 |
| 2011/0022819 | A1* | 1/2011 | Post et al. ...................... 711/207 |
| 2011/0047362 | A1* | 2/2011 | Eichenberger et al. ........ 712/226 |
| 2012/0210068 | A1* | 8/2012 | Joshi et al. ..................... 711/122 |
| 2013/0124794 | A1* | 5/2013 | Bux et al. ....................... 711/103 |

* cited by examiner

*Primary Examiner* — Charles Rones
*Assistant Examiner* — Nanci Wong
(74) *Attorney, Agent, or Firm* — DeLizio Gilliam, PLLC

(57) ABSTRACT

A hierarchically tagged cache provides abstraction between access requests for data and the cached data. The cache is managed by hierarchical layers of indexes including reference to the data. Access requests indicate a header for the requested data, which is associated with one of the layers. Cache management determines what layer is associated with the header, and can traverse the indexes, beginning at the layer associated with the header, to access the data. If the header does not exist at the index of that layer, it can be created. Indexes can be appropriately updated with indexes at each layer being referenced by one or more indexes of the layer higher up in the hierarchy.

18 Claims, 10 Drawing Sheets

HIERARCHICALLY TAGGED CACHE

FIELD

Embodiments described are related generally to management of data access, and embodiments described are more particularly related to implementing a cache with hierarchical tags.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2012, NetApp, Inc., All Rights Reserved.

BACKGROUND

Data for companies or other organizations is commonly stored in networked storage. The resources for storage and access bandwidth are limited. However, the amount of data and the desire to access data more quickly (i.e., in terms of time for access) and more efficiently (i.e., in terms of power and processing load) are all increasing. Thus, a common goal for a data center that stores and manages the networked data is to improve utilization of the resources of the networked storage, to improve storage utilization and access throughput.

The data access management of the data can implement service level objectives (SLOs) that define performance requirements for certain workloads or users, and can also implement caching of frequently used data. The data access management manages access to the data through file layout techniques, which define how the data is stored and accessed in a system. However, traditional data access management uses a single common file layout for all data in the system. Traditionally, the data representation by the file layout is closely coupled to the physical layout of the data in storage resources.

While a file layout can be made to efficiently share data in a networked storage system, it will be understood that the complexity and implementation costs of including access optimizations in a single common file layout for access to multiple different data types are prohibitive. The complexity and implementation costs are especially high when considering that data of different types or the same type can have different SLOs. Thus, traditional file layout for data access management of necessity works better for some data access scenarios than others. If the techniques of such a traditional file layout were used to manage data access for a cache, the effectiveness of the caching may be significantly lower than desired.

SUMMARY

A hierarchically tagged cache provides abstraction between access requests for data and the cached data. The cache is managed by hierarchical layers of indexes including reference to the data. Access requests indicate a header for the requested data, which is associated with one of the layers. Cache management determines what layer is associated with the header, and can traverse the indexes, beginning at the layer associated with the header, to access the data. If the header does not exist at the index of that layer, it can be created. Indexes can be appropriately updated with indexes at each layer being referenced by one or more indexes of the layer higher up in the hierarchy. In one embodiment, multiple indirection layers can be used. In one embodiment, a generation count is used to identify valid versus stale indexes. In one embodiment, the indirection supports delayed write, where allocation of a reference to a lower layer is delayed.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Descriptions of certain details and embodiments follow, including a description of the figures, which can depict some or all of the embodiments described below, as well as discussing other potential embodiments or implementations of the inventive concepts presented herein.

DETAILED DESCRIPTION

As described herein, a networked storage system includes caching. The system includes cache management that manages data access to the cached data via a flexible data layout. The data layout includes hierarchical tagging, which provides abstraction between access requests for data and the cached data itself. The representation of the data (e.g., block) at each layer of the hierarchy maps to, or references, the data directly, or references a block that maps directly to the data. A filesystem layer organizes data representation based on a file layout, or relationships between data elements. Examples include files and volumes. An abstraction layer organizes data by regions or extents of data, which can be organized by type, organization, workload, service level objective, or other virtual representation of the data. The abstraction layer maps data logically over a contiguous range of blocks, which may or may not correspond to a contiguous range of physical addresses. A physical mapping layer maps data to its physical address in the system. The physical mapping maps to disk or other storage for the data.

The cache management maintains indexes for the hierarchy of layers. Each index includes entries that match headers associated with the data buffers and each entry references the data directly (for physical mapping) or indirectly (for the higher layers of the hierarchy) by referencing an index entry that references a mapping or another index entry that eventually references a mapping of the data to its physical address. Access requests indicate a header or tag for the requested data; the header is associated with one of the layers. "Header" is primarily used herein to refer to the metadata associated with hierarchically tagging the data; however, "tag" could also be used. Cache management determines what layer is associated with the header, and can traverse the indexes, beginning at the layer associated with the header, to access the data. If the header does not exist at the index of that layer, the controller can create an entry for it. Index entries can be appropriately updated from other layers of the hierarchy. Index entries at each layer are referenced by one or more index entries of the layer higher up in the hierarchy.

Figure 1:
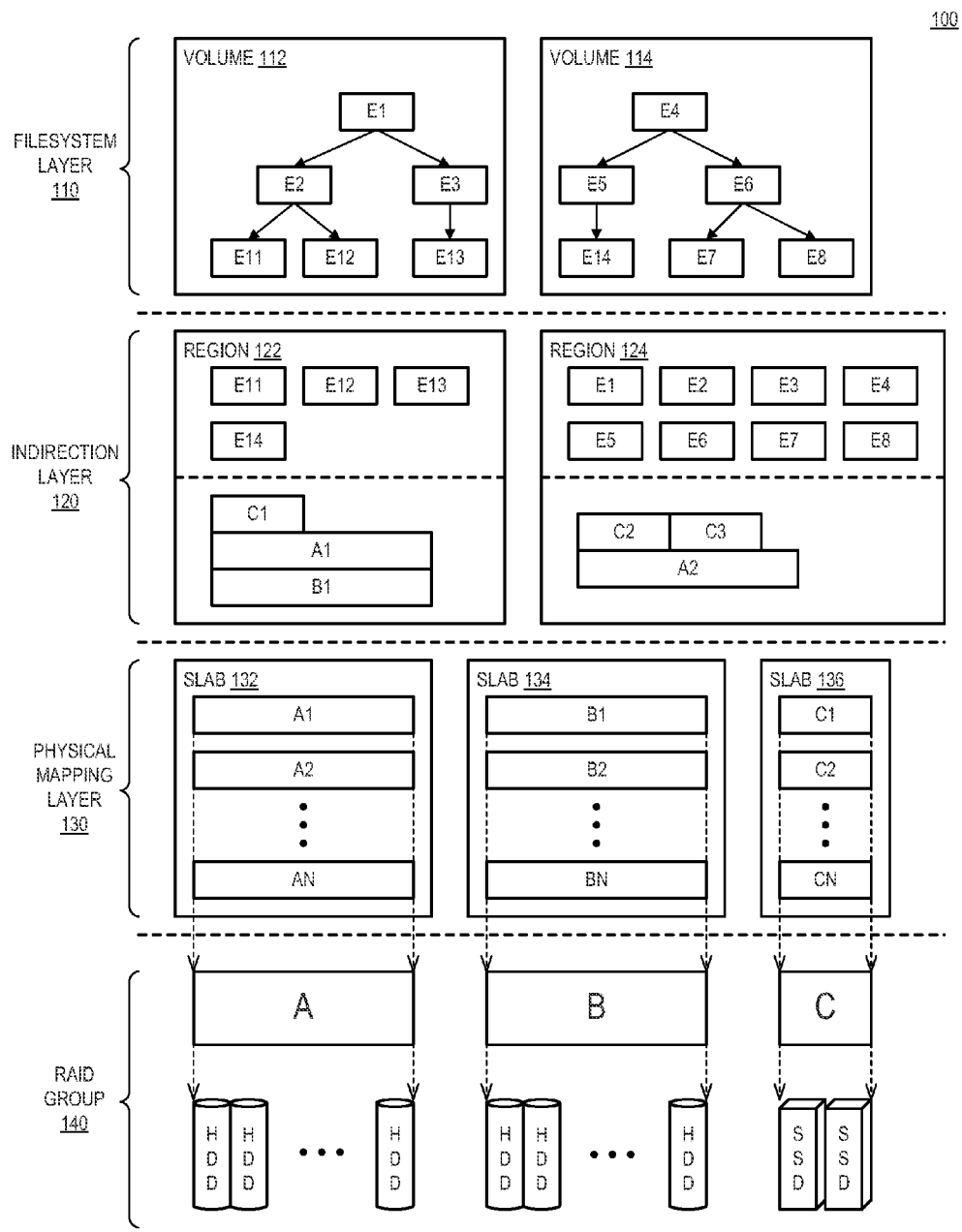
FIG. 1 is a block diagram of an embodiment of a hierarchically tagged layout for a cache.

FIG. 1 is a block diagram of an embodiment of a hierarchically tagged layout for a cache. System 100 illustrates the hierarchical layout. In one embodiment, system 100 includes filesystem layer 110 as the highest level of the hierarchy, indirection layer 120 below filesystem layer 110, and physical mapping layer 130 below indirection layer 120. Physical mapping layer 130 maps to the physical blocks, which can be exposed by RAID group 140. RAID (redundant array of independent drives) group 140 can implement any form of RAID known in the art.

Physical mapping layer 130 can also be referred to as a "slab layer", where data is stored in fixed-size blocks. Indirection layer 120 can also be referred to as an "extent layer" or "region layer", with extents or regions that are logically contiguous data. The logically contiguous data is not necessarily physically contiguous. The controller organizes data in indirection layer 120 by logical relationship, regardless of how it is organized in a file or volume, and regardless of how it is stored in the physical layer. The independence of the indirection layer provides flexibility in how the data is organized and accessed in system 100.

In one embodiment, the controller organizes data in filesystem layer 110 as trees of data (as shown). The tree of volume 112 has block E1 as a root, and further includes blocks E2, E3, E11, E12, and E13. The tree of volume 114 has block E4 as a root, and further includes blocks E5, E6, E14, E7, and E8. As shown, region 122 of indirection layer 120 includes blocks E11-E14. Region 124 includes blocks E1-E8. At indirection layer 120, the controller organizes data as region or extent blocks, which reference data blocks at physical mapping layer 130. Slab 132 represents one possible grouping of disk resources labeled as "A" in RAID group 140. Slab 134 represents one possible grouping of disk resources labeled as "B" in RAID group 140. Slab 136 represents one possible grouping of disk resources labeled as "C" in RAID group 140. Resources A and B are shown as traditional spinning platter hard drive devices, while resources C are shown as solid state drive devices. It will be understood that any combination of solid state and spinning platter drives or other nonvolatile storage could be used.

In system 100, the controller represents the same data blocks with different names or references at different layers. It will be understood that "block" is used to refer simply to a unit of data. At physical mapping layer 130, a block is fixed sized, and a slab has a physical layer name, which is the physical disk or location. At indirection layer 120, in one embodiment, the regions have an address range by region ID or extent ID and offset. The block size of a region is not fixed, but instead indirection layer 120 deals with variable-size blocks of data. The block of data at indirection layer 120 can be from a few physical blocks of data to thousands or more long. At filesystem layer 110, each volume is a filesystem metadata construct that gives a file ID and an offset to data.

In one embodiment, system 100 supports lazy allocation, which is a late binding of tags to a data buffer. The controller can delay a write, for example, at the filesystem layer, to allow more time for additional requests to come in that are related to requests already received. Thus, the controller can more efficiently use cache resources by storing related data in contiguous blocks.

In one embodiment, the controller migrates regions to a new slab at indirection layer 120 without any modification at filesystem layer 110 or physical mapping layer 130. The controller can perform the migration, for example, as a background process. The references in the indexes of filesystem layer 110 do not need to change, but the data referenced at the filesystem layer will be mapped to different resources. By mapping to different resources, the controller can reduce a processing load at filesystem layer 110.

Each of filesystem layer 110, indirection layer 120, and physical mapping layer 130 includes an index structure to track headers or metadata related to data buffers stored in a cache. In one embodiment, system 100 includes a B+-tree index per header type or index type (i.e., one for each of volume or file headers or indexes, extent or region headers or indexes, and slab headers or indexes). The controller can track indexes via B+-trees or hash tables, or other management technique. The index entries map to index entries of the layer below in the hierarchy, and thus provide a mapping from one layer to the other. Thus, one or more volume headers can map to a region index entry, one or more region headers can map to a slab index entry, which in turn maps to physical address space (or data buffers). Cache management, which includes the cache controller, can manage accessing the data buffers by traversing the indexes.

For example, consider a buffer retrieved via a lookup request to the cache associated with system 100. The lookup includes a header that identifies an index. The lookup request can contain either a volume header, a region header, a slab header, a volume and extent header, an extent and slab header, or, a volume, extent, and slab header. In one embodiment, the controller looks up the indexes in system 100 in order from physical mapping layer 130 up to filesystem layer 110, depending on the header(s) received with the request. When the controller finds a match, it returns the buffer to the requester. If a request does not pass in a lower layer header, then a match in one of the higher indexes (e.g., at the filesystem layer or indirection layer) may require a lookup in one of the lower indexes using the newly found mapping. Thus, in one embodiment, a lookup with only a volume header can result in the discovery of an extent header, which subsequently is looked up to find the slab header and data buffer mapped by the slab header.

In one embodiment, if the controller cannot find a slab tag and data buffer, but the request specifies that the data block exists on disk, the controller can query the layer that received the request to resolve the next layer header, based on the metadata discussed above that hierarchically maps the layers. In one embodiment, the controller blocks the requests while header resolution is in process, until the lookup is completed. Once the processing completes and the next level header is found, the controller can update indexes with the new header mappings. In one embodiment, an index at a higher layer can point directly to the data buffer being queried while the processing occurs to complete the lookup. In one embodiment, creation of an index entry at the filesystem layer or region (indirection) layer can be followed by creation of a slab index entry to map to the data buffer, instead of having the higher layer index directly map to the data buffer.

As shown, there is a single indirection layer 120. It will be understood that system 100 can include multiple indirection layers 120. Structurally, there should only be one filesystem layer (although multiple volumes can be stored within the layer) and one slab layer. However, there can be multiple indirection layers based on the design of the system. More indirection layers can provide additional flexibility in organizing and managing the data, at the cost of additional metadata, and another layer of indexing to traverse.

Figure 2:
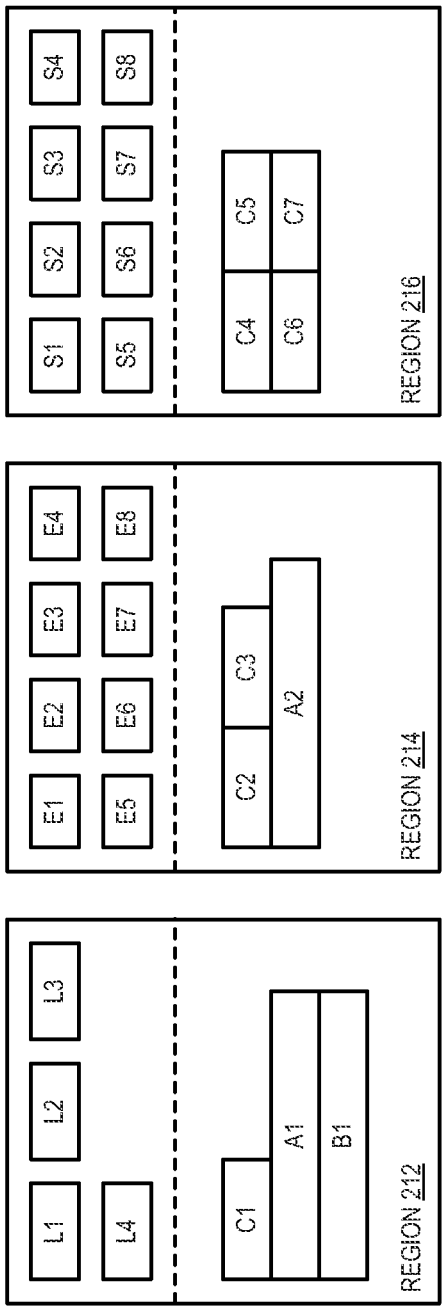
FIG. 2 is a block diagram of an embodiment using an indirection layer of a hierarchically tagged cache to manage data by type.

FIG. 2 is a block diagram of an embodiment using an indirection layer of a hierarchically tagged cache to manage data by type. Layer 200 represents one embodiment of an indirection layer according to indirection layer 120 of FIG. 1. In layer 200, the controller organizes and manages the data layout based on file type. The controller will similarly keep indexes to represent the layout. Thus, for purposes of the illustration in FIG. 2, consider the labels 'L', 'E', and 'S' to refer to different types of data. The type can be different types of data, data associated with different users, data associated with different SLOs, data associated with different applications, or other logical grouping of data.

As shown, region 212 includes indexes for data of type 'L', region 214 includes indexes for data of type 'E', and region 216 includes indexes for data of type 'S'. The blocks below the dashed lines in each of the regions represent slab blocks to which the region blocks are mapped. Thus, for each region, the controller keeps indexes (as described in more detail below) that map each region or extent to the slab indexes.

It will be understood that as suggested above, the organization and mapping at indirection layer 200 can be dynamic while the system is running. Thus, a cache controller can identify data based on any type, and create a region for data of that type. The index entries of the filesystem layer can continue to map to the region index entries without any change, but the cache controller can manage the region blocks in a different way than when the filesystem was originally mapped to them.

Figure 3:
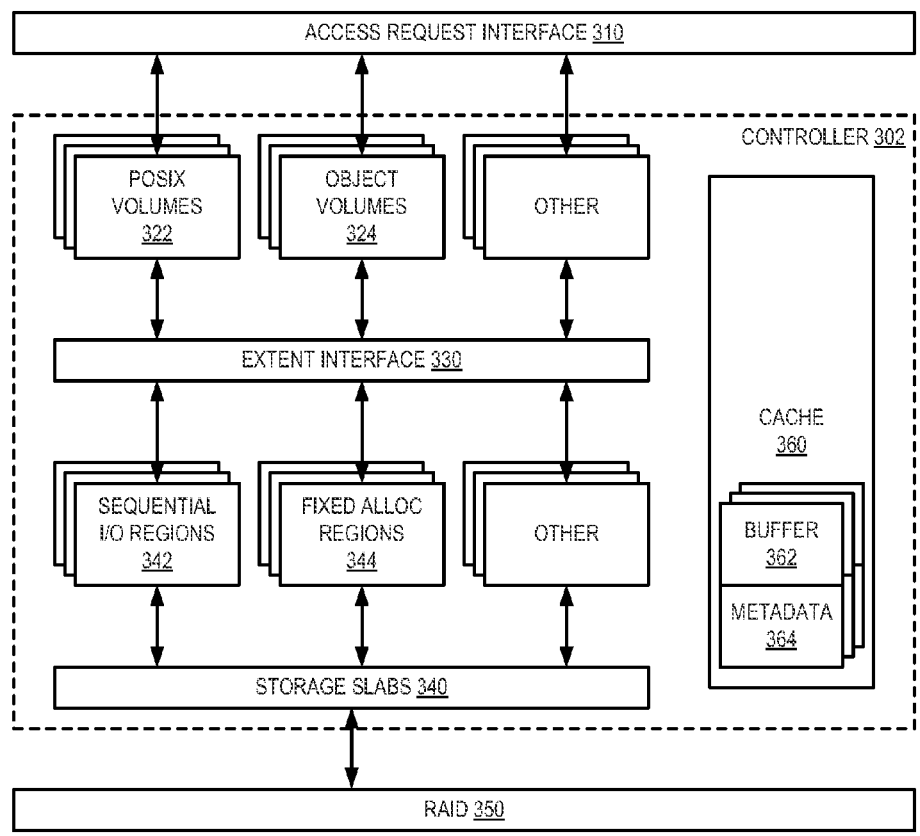
FIG. 3 is a block diagram of an embodiment of a manager for a hierarchically tagged cache.

FIG. 3 is a block diagram of an embodiment of a manager for a hierarchically tagged cache. Cache management system 300 is an example of a cache controller in accordance with any embodiment described herein. System 300 includes controller 302, which manages caching with hierarchical index layers as described herein. Posix volumes 322, object volumes 324, and other volumes or file types represent instances of volumes in a filesystem layer (e.g., filesystem layer 110 of FIG. 1). Sequential I/O regions 342, fixed allocation regions 344, and other regions represent instances of regions in an indirection layer (e.g., indirection layer 120 of FIG. 1). Storage slabs 340 represent the physical mapping layer (e.g., physical mapping layer 130 of FIG. 1).

In addition to the three layers identified, system 300 includes access request interface 310, through which requests for data access would generally come from a user. The filesystem layer resides directly below the access request interface layer 310. The filesystem layer can communicate with the region or indirection layer via extent interface 330. The indirection layer can also pass index information back up to the filesystem layer to keep all headers and indexes up to date. Thus, index information can be written at layers other than the layer receiving the request, to maintain all index data up to date. It will be understood that in an implementation where multiple indirection layers are used, additional interfaces would exist between the different indirection layers. The indirection layer communicates to storage slabs 340 (which could also be referred to as a physical mapping layer or slab allocation layer).

As shown, system 300 can have multiple instantiations of either the filesystem layer and/or the indirection layer. These filesystem and indirection layer components are customizable based on the workload and the desired data layout. Cache 360 resides to the side of the three layers and interacts with each of them. Cache 360 stores buffers 362, and each data buffer includes associated metadata 364. Cache controller retrieves buffers 362 from storage and caches them. Metadata 364 can include the various headers for the index entries at each layer. In one embodiment, cache 360 is local to the requesters attempting to access data, and the storage where the data originates is remote over a network.

The filesystem layer is the core file system through which high-level user access to data is managed. The indirection layer handles collections of contiguous related blocks. The slab layer or physical mapping layer is responsible for storing data blocks on physical disks using RAID 350. Each layer refers to a data block in a different manner. Thus, each layer has a different name or key for the block. The different names are associated with the data buffers in a memory state, such as through metadata 364. Thus, a single data buffer 362 has multiple header associated with it to be used by the different layers to reference the data. Additionally, a shared block (e.g., one that is deduplicated) can have multiple headers of the same type (e.g., multiple volume headers, or multiple region headers) associated with it.

It will be understood that cache 360 does not store all data buffers indefinitely. Thus, cache controller 302 eventually evicts buffers 362 from cache 360, based on an eviction policy implemented by controller 302. In one embodiment, controller 302 uses a least recently used (LRU) policy to evict buffers. Other policies are possible. In one embodiment, controller 302 keeps a list of buffers 362, rather than keeping a list of index entries, for purposes of eviction. The indexes are the mechanisms used for management of the layers. Thus, there can be index entries in the various layers that are associated with a data buffer that is no longer in cache 360. In one embodiment, the slab header is kept with the buffer so that when the buffer gets evicted, the slab header also gets evicted. Otherwise, a slab block could invalidly map to a different data buffer than what is expected. The volume and indirection tags can be kept without the same risk of accessing incorrect data.

In one embodiment, controller 302 could also remove the indexes of the higher layers when a buffer is evicted. However, index entry eviction would require more processing overhead, including more communicating through the interfaces. As an alternative, the controller could use an LRU mechanism for index entry eviction at each layer, independent of the other layers, to evict stale entries to allow placing new entries.

In one embodiment, system 300 supports delayed write allocation. Assume write requests are received via access request interface 310 at the filesystem or volume layer. Controller 302 can assign a volume ID, but wait to assign a region ID or a slab ID. Thus, initially there will be a volume ID, but not a region ID or slab ID. The volume index entry can point directly to the buffer in cache 360. Delaying the write can allow the system to write larger blocks of data at the same time, which can improve storage resource efficiency by writing related blocks together.

Figure 4:
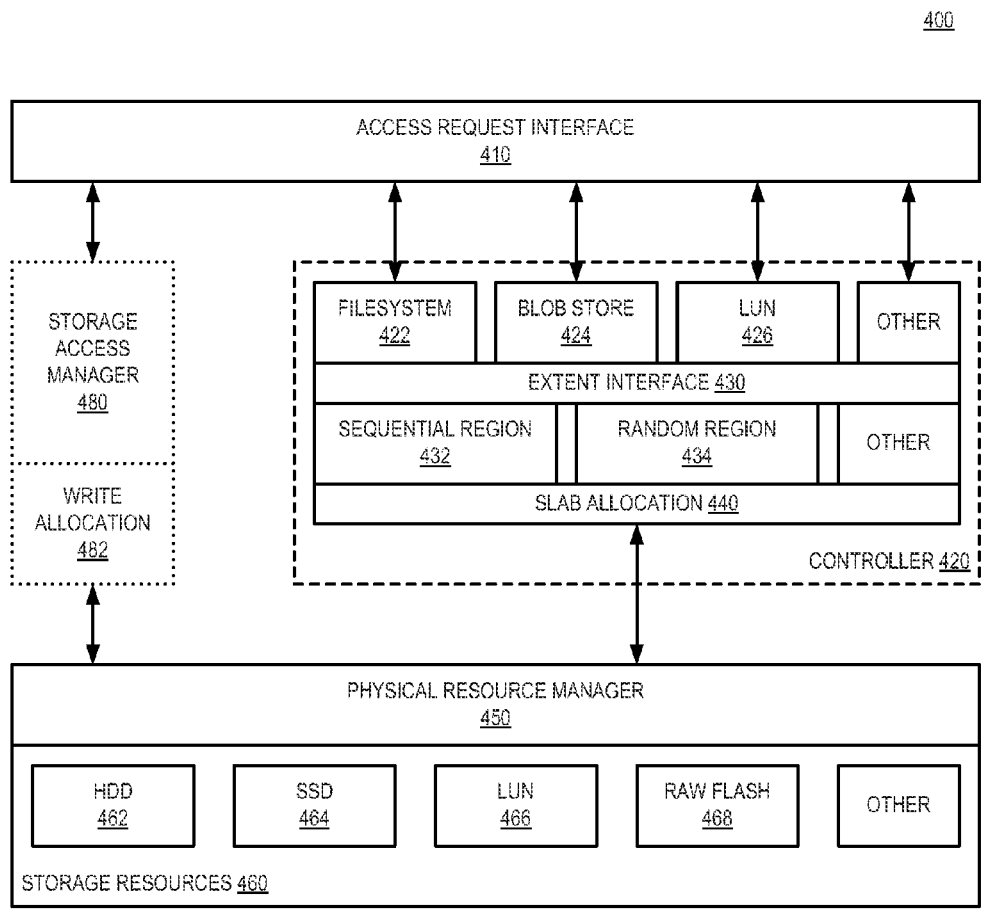
FIG. 4 is a block diagram of an embodiment of a manager for a hierarchically tagged cache in parallel with a storage access manager.

FIG. 4 is a block diagram of an embodiment of a manager for a hierarchically tagged cache in parallel with a storage access manager. System 400 is a cache management system, and can be an example of a cache controller in accordance with system 300 of FIG. 3. System 400 more particularly illustrates the physical storage resources that can be used in a storage system, and illustrates controller 420 in parallel with a storage access manager 480. In one embodiment, controller 420 manages cache access while storage access manager 480 manages storage access. In one embodiment, controller 420 could also manage storage access.

Storage access manager 480 provides a file layout for storage access, and can be a traditional system that provides direct mapping from the file layout to the physical storage resources. In contrast, controller 420 abstracts the mapping of the file layout to the physical storage resources with multiple layers as discussed above.

Access request interface 410 can provide access to either the components of controller 420, or to storage access manager 480. In one embodiment, controller 420 includes filesystem 422, BLOB (binary large object) store 424, LUN (logical unit number) 426, and possibly other constructs. These components make up the filesystem layer. The filesystem layer communicates with an indirection layer via extent interface 430. In one embodiment, the indirection layer includes sequential region 432, random region 434, and possibly other regions. In one embodiment, regions are organized based on whether they have random data or contiguous data. As discussed above, there are other ways to organize the indirection layer.

Controller 420 also includes physical mapping layer slab allocation 440, which is directly below the lowest level of indirection layer. Slab allocation 440 maps blocks to physical addresses of data buffers. Slab allocation 440 maps to physical address space via physical resource manager 450, such as a RAID controller. Storage access manager 480 directly maps its file layout to physical address space via physical resource manager 450. In one embodiment, storage access manager 480 includes write allocation manager 482 to manage writes to the physical storage.

Physical resource manager 450 can manage any of a number of different types of storage resources 460, including, but not limited to, hard drive (HDD) 462, solid state drive (SSD) 464, logical unit number storage (LUN) 466, raw flash 468, or other storage. The storage can be local to a device that executes controller 420, or can be accessible remotely over a network connection. In one embodiment, controller 420 is implemented as a virtual machine in hardware that is remote from storage resources 460.

Figure 5:
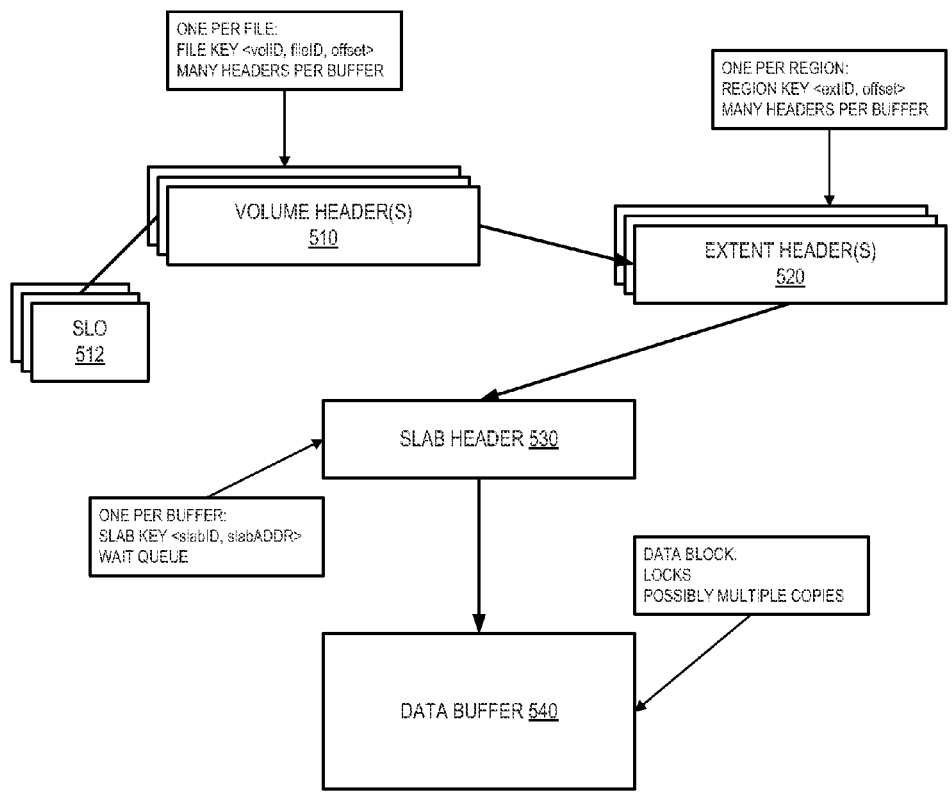
FIG. 5 is a block diagram of an embodiment of a hierarchical tag configuration.

FIG. 5 is a block diagram of an embodiment of a hierarchical header configuration. Hierarchy 500 illustrates headers in a hierarchical relationship with each other and with data buffer 540. The headers are alternatively referred to as tags. As described herein, the indexes at the layers include the information of the hierarchy of headers shown in hierarchy 500.

Hierarchy 500 is shown from the perspective of a logical structure for the data buffer. A cache caches data buffers, which are single fixed sized blocks (e.g., 4 KB blocks). Each block (data buffer 540) can be associated with a number of headers, starting with physical slab header 530. Every data buffer 540 in the cache should have a slab header associated with it. Each data buffer 540 may or may not have one or multiple extent headers 520 or volume headers 510 associated with it as well. By allowing multiple volume headers 510 and extent headers 520 to point to the same slab header 530, the cache controller allows for an easy representation of de-duplicated data.

Briefly, with de-duplicated data, the cache controller causes two volume headers (or logically, two volume blocks) or extent headers (or logically, two region blocks) to point to the same data buffer 540. Rather than storing the data buffer twice, the cache controller allows multiple logical blocks (via extent headers 520) to map to a single physical block. Likewise, multiple volume headers 510 can map to a single indirection block.

Referring to the tags or header information used to index the blocks at each layer, volume headers 510 can include, per file, a FILE KEY with a volume ID, file ID, and offset. Extent headers 520 can include a REGION KEY with an extent ID and an offset. Slab headers 530 can include a SLAB KEY with a slab ID and a slab address. The controller uses volume headers 510 in the filesystem layer (volumes) to locate data blocks given the volume, fileID, and file block number (offset) within the file. The controller uses extent headers 520 in the filesystem layer and the indirection layer (extents) to locate a block within an extent by extentID and offset. The controller uses slab header 530 in the indirection layer and the slab layer (physical mapping layer) to locate a block of physical storage.

It will be understood that as shown, volume headers 510 would only be able to index L0 data blocks, or level 0 data blocks. Level 0 data blocks are the lowest level of indirection. To enable the use of multiple levels of indirection, additional information should be added to the volume headers. In one embodiment, volume headers 510 include information in a key indicating what level of indirection the index points to. Alternatively, if a file's metadata is stored in a different file, a unique fileId can be used to identify the metadata.

In one embodiment, SLOs are stored with the files. Thus, hierarchy 500 illustrates SLO 512 associated with volume headers 510. As mentioned above, the cache controller can rearrange the organization of the indirection layer(s) to meet the SLOs. Examples of rearrangement include moving processing of certain regions to lighter-used resources. The controller can rearrange the indirection layer with having to make any changes in the filesystem layer or the physical mapping layer. Thus, changes can be localized to one layer in hierarchy 500.

It is possible to associate slab header 530 with multiple data buffers. Slab header 530 can be associated with multiple buffers in a situation where a write request arrives for a buffer that is in the process of being write allocated or cleaned. It is understood that a dirty buffer is a buffer where the value of the data in the buffer has been changed in cache, but the changed data has not yet been written to storage. Cleaning a buffer refers to a process or mechanism where the dirty buffer is written to storage. In one embodiment, the controller marks data buffers in the process of being write allocated as copy-on-write (COW), and a new copy of the data buffer is made writeable. In such a case, slab header 530 can map to both buffers until the process is completed, and the buffer marked as COW is released and evicted. In one embodiment, write allocation at the filesystem layer involves the controller mapping a region to a range of space associated with a file. In one embodiment, write allocation at the indirection layer involves the controller mapping a slab ID and address to an extent header.

In one embodiment, there are times when the controller maps the volume or region indexes directly to data buffers rather to the next level of the hierarchy. One such time is if write allocation has not yet been performed, and thus there is no available mapping to the next level of the hierarchy at the moment the controller creates the index. Another such time is if the controller is obtaining a next level of mapping for the data buffer, such as for a first access to the data buffer.

There are different ways the controller of hierarchy 500 can handle tracking the mappings when evicting a data buffer from cache. In a naïve implementation, the controller could create a backpointer from each lower level index to the next higher level index. However, since data buffers can be shared across multiple indexes at each level of the hierarchy, the use of backpointers would add a large (unbounded) overhead in terms of in-memory space consumed by the backpointers. As an alternative to using backpointers, the controller can determine what mappings are outdated, and so can be discarded on subsequent lookups.

In one embodiment, the controller manages the indexes of each layer independently, which means that eviction at one layer does not necessarily cause eviction at another layer. Additionally, the controller can keep an eviction policy for each index (e.g., an LRU scheme to evict mappings not used in some amount of time). In one embodiment, the controller associates a generation count with each data buffer. The controller increments the generation count whenever a data buffer is evicted, and copies the generation count into the index when the data buffer is inserted in the cache. If an index's generation number does not match the generation number of the buffer it references, the controller determines the mapping to be stale and evicts the index.

Figure 6:
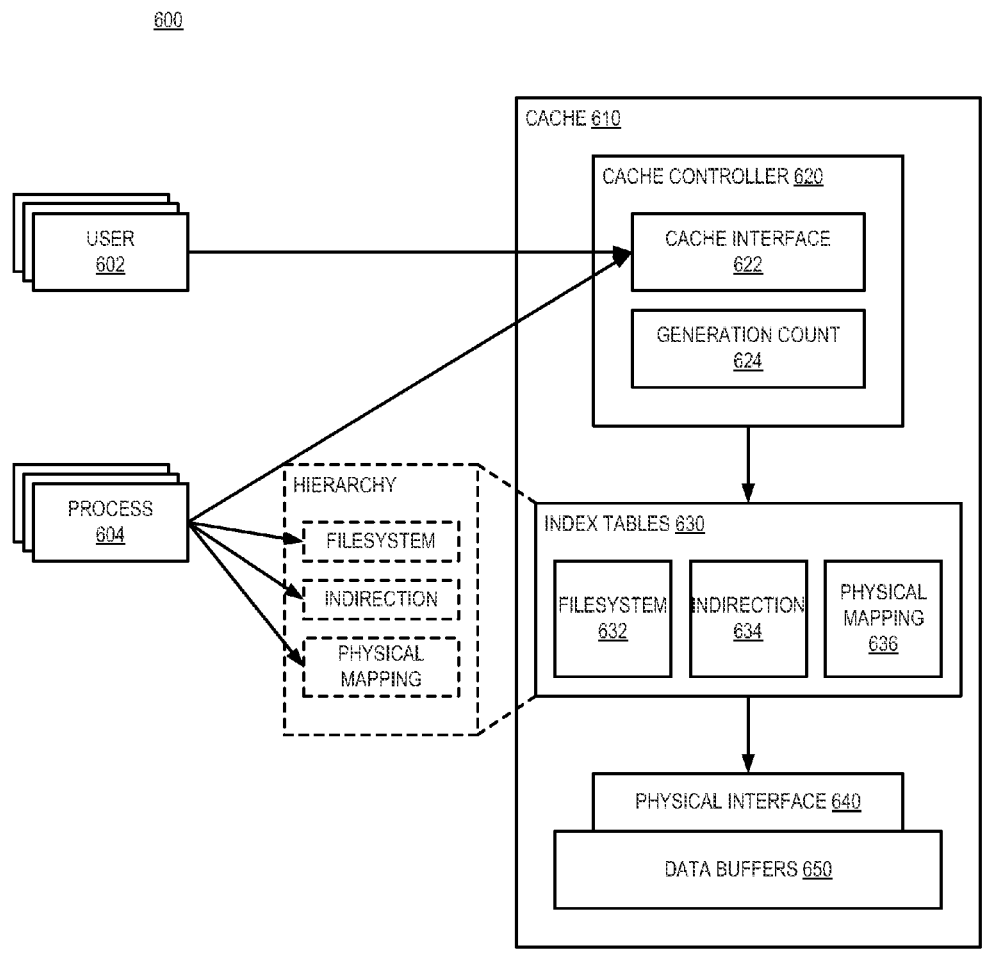
FIG. 6 is a block diagram of an embodiment of access to cached data via a hierarchically tagged cache.

FIG. 6 is a block diagram of an embodiment of access to cached data via a hierarchically tagged cache. System 600 includes cache 610, which is managed by cache controller 620. Users 602 and/or processes 604 can generate requests for data buffers 650 stored in cache 610. Users 602 can include any application or process executed by a client or a user of a networked storage system for which cache 610 caches data. Processes 604 further include internal processes, such as those that can be executed by cache controller 620 or other system-level processes.

As illustrated, cache controller 620 receives user requests at cache interface 622 (e.g., access request interface 310 of FIG. 3, access request interface 410 of FIG. 4). Processes 604 can make requests through cache interface 622, as well as being able to make requests at any level of the hierarchy. Thus, with the hierarchy, each layer is separately accessible for lookup and insertion. The filesystem layer typically drives the data lookup, as it is the layer through which most requests will be received. However, the indirection layer can also drive the data lookup in cache 610.

In one embodiment, cache 610 includes index tables 630 to index the headers or tags used to identify data blocks in system 600. In one embodiment, cache controller 620 maintains one table for each layer. Thus, as shown index tables 630 include filesystem table 632, indirection table 634, and physical mapping (e.g., slab) table 636. Index tables 630 represents the tables of indexes that cache controller 620 maintains. The dashed-line blowup represents the hierarchical nature of the different layers.

The accessed requests received from users 602 or processes 604 include a tag to identify the data buffer(s) sought. Cache controller 620 can extract an identifier from the tag to use as a key to traverse index tables 630. In one embodiment, each tag is associated with a hierarchy layer identified in the tag. The hierarchy layer identified can indicate to cache controller 620 what index layer is associated with the tag, and where the cache controller should begin a lookup for the data buffer.

In one embodiment, cache controller 620 keeps generation count 624 for each data buffer 650 of cache 610. As mentioned above with respect to a generation count, generation count 624 enables cache controller 620 to determine when an index is out of date. For example, in one embodiment, cache controller 620 stores a generation count with a volume header (e.g., see FIG. 5), as well as storing a generation count with an associated or referenced data buffer 650. The cache controller increments the generation count every time the data buffer is allocated (used) to hold a different data block, or every time the data buffer is evicted. If the volume header does not include the right generation count, then cache controller 620 identifies it as being stale and evicts the index.

Figure 7:
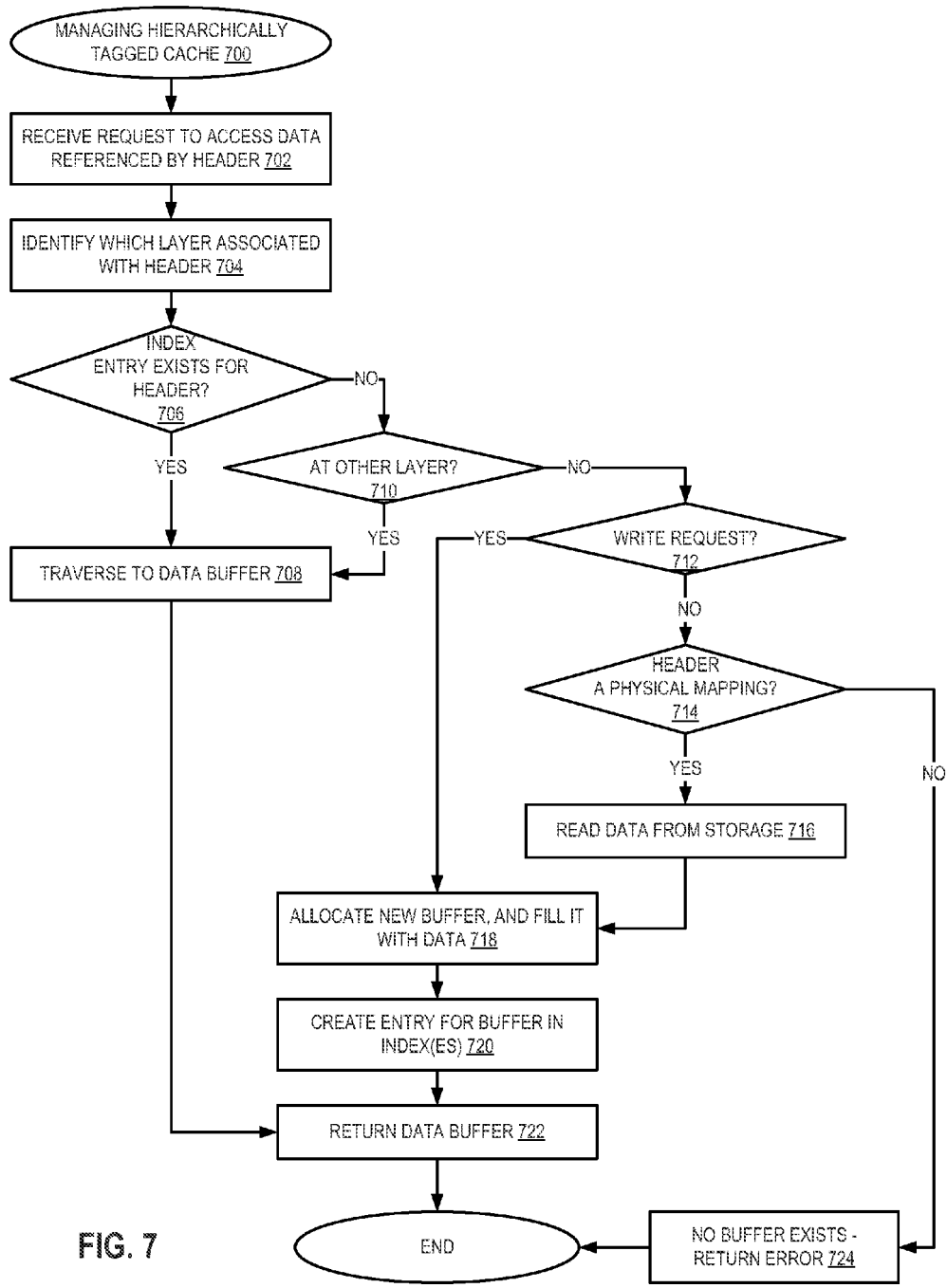
FIG. 7 is a flow diagram of an embodiment of a process for implementing a hierarchically tagged cache.

FIG. 7 is a flow diagram of an embodiment of a process for implementing a hierarchically tagged cache. A header or a tag can be thought of as a name or key for a data buffer. As described herein, the controller manages the headers in a hierarchy (i.e., one header references a second which finally identifies the data buffer). Attaching multiple headers to a buffer enables block sharing within a cache. The controller can use block sharing within the cache to reduce the size of memory resident data structures, thus increasing memory efficiency. The block sharing provides significant benefit in a cache system that uses de-duplication or snapshotting/cloning techniques at a lower layer (e.g., de-duplication at either the indirection layer or physical mapping layer). As described, process 700 provides for managing a hierarchically tagged cache.

The cache system receives a request to access data referenced by a header, process block 702. While the highest level of the hierarchy (the filesystem layer) typically receives the requests, any of the layers can receive the request. In one embodiment, any of three different types of headers can be used in the request: volume or file headers, region or extent headers, and slab or disk headers. The cache controller processes the request, and identifies which layer is associated with the header, process block 704. The layer can be a filesystem layer, one of one or more layers of indirection, or a physical mapping layer.

If there is an entry in an index for the layer determined to be associated with the header, process block 706, the controller can traverse the indexes of the various layers, process block 708, to obtain access to a data buffer to return the data buffer, process block 722. If there is no entry in the index, process block 706, the controller can determine if there is an entry at another layer of the hierarchy, process block 710. If there is an entry at another layer, the controller can create an entry at the other layer of the hierarchy, map the two entries to each other, and traverse the indexes to return the data buffer, process blocks 708 and 722.

If the controller determines there is no entry at another layer, process block 710, the controller can determines if the request is a write request or a read request. If the controller determines the request is a write request, process block 712, the controller performs write allocation. In write allocation, the controller allocates a new buffer, and fills the buffer with data, process block 718. In one embodiment, there are circumstances under which the controller will delay the creation of an entry in the index. Thus, in one embodiment, the controller determines if the write should be delayed. If the write is to be delayed, the controller continues processing and buffer access operations until the time to create the entry.

If the request is not a write request, process block 712, the request is a read request, and the controller can determine if the header of the received request is a physical mapping, process block 714. If the header is not a physical mapping, then the controller determines that no buffer exists, and can return an error, process block 724. If the header is a physical mapping, process block 714, the controller reads the data from storage, process block 716. Once the data is read, the controller can allocate a new buffer and fill it, process block 718. Alternatively, if the request is a write request, process block 712, the controller can perform write allocation and allocate a new buffer and fill the new buffer, process block 718. In one embodiment, the controller creates a physical mapping at the time of write allocation. In one embodiment, the controller creates a physical mapping only at the time of write allocation.

The controller can create an entry for the buffer in one or more layers of the hierarchy, process block 720. The controller can return the data buffer after write allocation, process block 722. In one embodiment, write allocation will also include updating information in the index hierarchy. When a valid data buffer is returned, the process ends. Process 700 ends after the data buffer is returned, process block 722, or after an error is returned when no buffer exists, process block 724.

It will be understood that having individual index structures per mapping layer allows the different storage system layers to independently lookup only the mappings required. Additionally, the individual index structure allows for the delayed allocation of physical storage to data buffers. For example, the controller can allocate a file at the filesystem layer without the physical space on the disk being reserved (thus no disk/slab mapping exists). At a later stage the controller can perform physical allocation (layout decision) and insert the appropriate mapping(s) into the appropriate index(es).

Figure 8A:
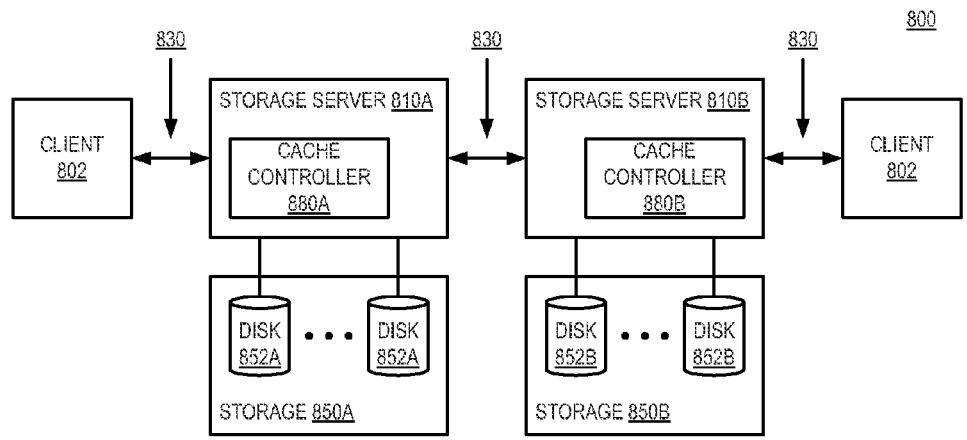
FIG. 8A illustrates a network storage system in which a hierarchically tagged cache can be implemented.

FIG. 8A illustrates a network storage system in which virtual cache appliance management can be implemented. Storage servers 810 (storage servers 810A, 810B) each manage multiple storage units 850 (storage 850A, 850B) that include mass storage devices. These storage servers provide data storage services to one or more clients 802 through a network 830. Network 830 can be, for example, a local area network (LAN), wide area network (WAN), metropolitan area network (MAN), global area network such as the Internet, a Fibre Channel fabric, or any combination of such interconnects. Each of clients 802 can be, for example, a conventional personal computer (PC), server-class computer, workstation, handheld computing or communication device, or other special or general purpose computer.

Storage of data in storage units 850 is managed by storage servers 810 which receive and respond to various read and write requests from clients 802, directed to data stored in or to be stored in storage units 850. Storage units 850 constitute mass storage devices which can include, for example, flash memory, magnetic or optical disks, or tape drives, illustrated as disks 852 (852A, 852B). Storage devices 852 can further be organized into arrays (not illustrated) implementing a Redundant Array of Inexpensive Disks/Devices (RAID) scheme, whereby storage servers 810 access storage units 850 using one or more RAID protocols known in the art.

Storage servers 810 can provide file-level service such as used in a network-attached storage (NAS) environment, block-level service such as used in a storage area network (SAN) environment, a service which is capable of providing both file-level and block-level service, or any other service capable of providing other data access services. Although storage servers 810 are each illustrated as single units in FIG. 8A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module), and the N-module can include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 8B and embodiments of a D-module and an N-module are described further below with respect to FIG. 9.

In one embodiment, storage servers 810 are referred to as network storage subsystems. A network storage subsystem provides networked storage services for a specific application or purpose, and can be implemented with a collection of networked resources provided across multiple storage servers and/or storage units.

In the embodiment of FIG. 8A, one of the storage servers (e.g., storage server 810A) functions as a primary provider of data storage services to client 802. Data storage requests from client 802 are serviced using disks 852A organized as one or more storage objects. A secondary storage server (e.g., storage server 810B) takes a standby role in a mirror relationship with the primary storage server, replicating storage objects from the primary storage server to storage objects organized on disks of the secondary storage server (e.g., disks 850B). In operation, the secondary storage server does not service requests from client 802 until data in the primary storage object becomes inaccessible such as in a disaster with the primary storage server, such event considered a failure at the primary storage server. Upon a failure at the primary storage server, requests from client 802 intended for the primary storage object are serviced using replicated data (i.e. the secondary storage object) at the secondary storage server.

It will be appreciated that in other embodiments, network storage system 800 can include more than two storage servers. In these cases, protection relationships can be operative between various storage servers in system 800 such that one or more primary storage objects from storage server 810A can be replicated to a storage server other than storage server 810B (not shown in this figure). Secondary storage objects can further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 810 should be taken as illustrative only.

In one embodiment, storage servers 810 include cache controller components 880 (880A, 880B). Cache controllers 880 enable storage servers 810 to manage a cache in system 800 with hierarchical headers. In one embodiment, cache controllers 880 are implemented at the client side, rather than in the storage servers.

Figure 8B:
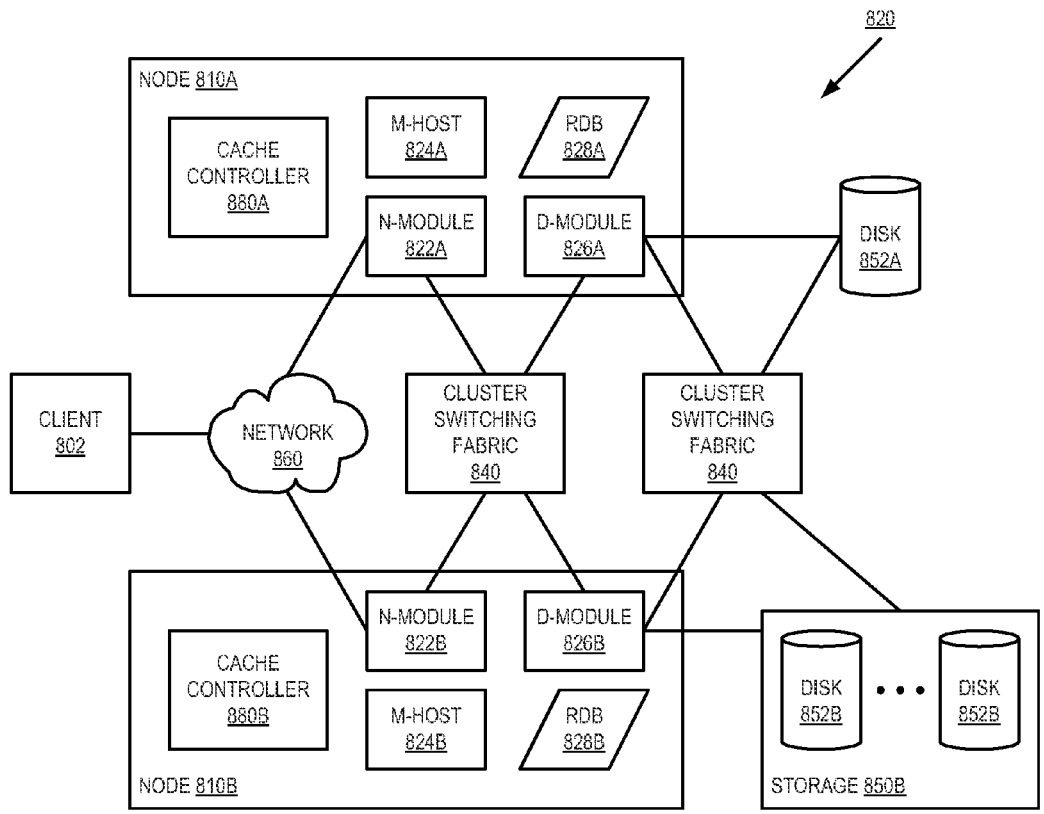
FIG. 8B illustrates a distributed or clustered architecture for a network storage system in which a hierarchically tagged cache can be implemented in an alternative embodiment.

FIG. 8B illustrates a distributed or clustered architecture for a network storage system in which virtual cache appliance management can be implemented in an alternative embodiment. System 820 can include storage servers implemented as nodes 810 (nodes 810A, 810B) which are each configured to provide access to storage devices 852. In FIG. 8B, nodes 810 are interconnected by a cluster switching fabric 840, which can be embodied as an Ethernet switch.

Nodes 810 can be operative as multiple functional components that cooperate to provide a distributed architecture of system 820. To that end, each node 810 can be organized as a network element or module (N-module 822A, 822B), a disk element or module (D-module 826A, 826B), and a management element or module (M-host 824A, 824B). In one embodiment, each module includes a processor and memory for carrying out respective module operations. For example, N-module 822 can include functionality that enables node 810 to connect to client 802 via network 860 and can include protocol components such as a media access layer, Internet Protocol (IP) layer, Transport Control Protocol (TCP) layer, User Datagram Protocol (UDP) layer, and other protocols known in the art.

In contrast, D-module 826 can connect to one or more storage devices 852 via cluster switching fabric 840 and can be operative to service access requests on devices 850. In one embodiment, the D-module 826 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 8B, a storage abstraction layer (e.g., file system) of the D-module divides the physical storage of devices 850 into storage objects. Requests received by node 810 (e.g., via N-module 822) can thus include storage object identifiers to indicate a storage object on which to carry out the request.

Also operative in node 810 is M-host 824 which provides cluster services for node 810 by performing operations in support of a distributed storage system image, for instance, across system 820. M-host 824 provides cluster services by managing a data structure such as a relational database (RDB) 828 (RDB 828A, RDB 828B) which contains information used by N-module 822 to determine which D-module 826 "owns" (services) each storage object. The various instances of RDB 828 across respective nodes 810 can be updated regularly by M-host 824 using conventional protocols operative between each of the M-hosts (e.g., across network 860) to bring them into synchronization with each other. A client request received by N-module 822 can then be routed to the appropriate D-module 826 for servicing to provide a distributed storage system image.

In one embodiment, node 810A includes cache controller 880A and node 810B includes cache controller 880B. Alternatively, cache controller 880A can be located at the client side and associated with node 810A. Similarly, cache controller 880B can be located at the client side and associated with node 810B. Cache controllers 880, as described above, manage a cache with hierarchical levels of headers and indexes.

It will be noted that while FIG. 8B shows an equal number of N- and D-modules constituting a node in the illustrative system, there can be different number of N- and D-modules constituting a node in accordance with various embodiments. For example, there can be a number of N-modules and D-modules of node 810A that does not reflect a one-to-one correspondence between the N- and D-modules of node 810B. As such, the description of a node comprising one N-module and one D-module for each node should be taken as illustrative only.

Figure 9:
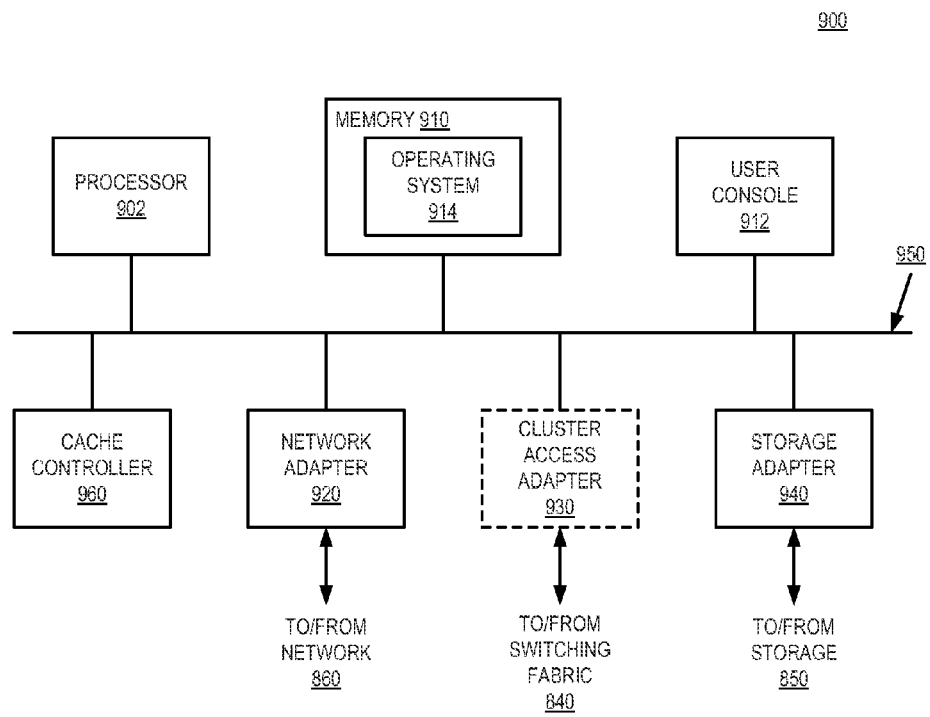
FIG. 9 is a block diagram of an illustrative embodiment of an environment of FIGS. 8A and 8B in which a hierarchically tagged cache can be implemented.

FIG. 9 is a block diagram of an embodiment of a storage server, such as storage servers 810A and 810B of FIG. 8A, embodied as a general or special purpose computer 900 including a processor 902, a memory 910, a network adapter 920, a user console 912 and a storage adapter 940 interconnected by a system bus 950, such as a convention Peripheral Component Interconnect (PCI) bus.

Memory 910 includes storage locations addressable by processor 902, network adapter 920 and storage adapter 940 for storing processor-executable instructions and data structures associated with a multi-tiered cache with a virtual storage appliance. A storage operating system 914, portions of which are typically resident in memory 910 and executed by processor 902, functionally organizes the storage server by invoking operations in support of the storage services provided by the storage server. It will be apparent to those skilled in the art that other processing means can be used for executing instructions and other memory means, including various computer readable media, can be used for storing program instructions pertaining to the inventive techniques described herein. It will also be apparent that some or all of the functionality of the processor 902 and executable software can be implemented by hardware, such as integrated currents configured as programmable logic arrays, ASICs, and the like.

Network adapter 920 comprises one or more ports to couple the storage server to one or more clients over point-to-point links or a network. Thus, network adapter 920 includes the mechanical, electrical and signaling circuitry needed to couple the storage server to one or more clients over a network. Each client can communicate with the storage server over the network by exchanging discrete frames or packets of data according to pre-defined protocols, such as TCP/IP.

Storage adapter 940 includes a plurality of ports having input/output (I/O) interface circuitry to couple the storage devices (e.g., disks) to bus 950 over an I/O interconnect arrangement, such as a conventional high-performance, FC or SAS (Serial-Attached SCSI (Small Computer System Interface)) link topology. Storage adapter 940 typically includes a device controller (not illustrated) comprising a processor and a memory for controlling the overall operation of the storage units in accordance with read and write commands received from storage operating system 914. As used herein, data written by a device controller in response to a write command is referred to as "write data," whereas data read by device controller responsive to a read command is referred to as "read data."

User console 912 enables an administrator to interface with the storage server to invoke operations and provide inputs to the storage server using a command line interface (CLI) or a graphical user interface (GUI). In one embodiment, user console 912 is implemented using a monitor and keyboard.

In one embodiment, computing device 900 includes cache controller 960. While shown as a separate component, in one embodiment, cache controller 960 is part of other components of computer 900. Cache controller 960 enables computer 900 to hierarchically manage a cache with layers of indexes and headers.

When implemented as a node of a cluster, such as cluster 820 of FIG. 8B, the storage server further includes a cluster access adapter 930 (shown in phantom) having one or more ports to couple the node to other nodes in a cluster. In one embodiment, Ethernet is used as the clustering protocol and interconnect media, although it will be apparent to one of skill in the art that other types of protocols and interconnects can by utilized within the cluster architecture.

Figure 10:
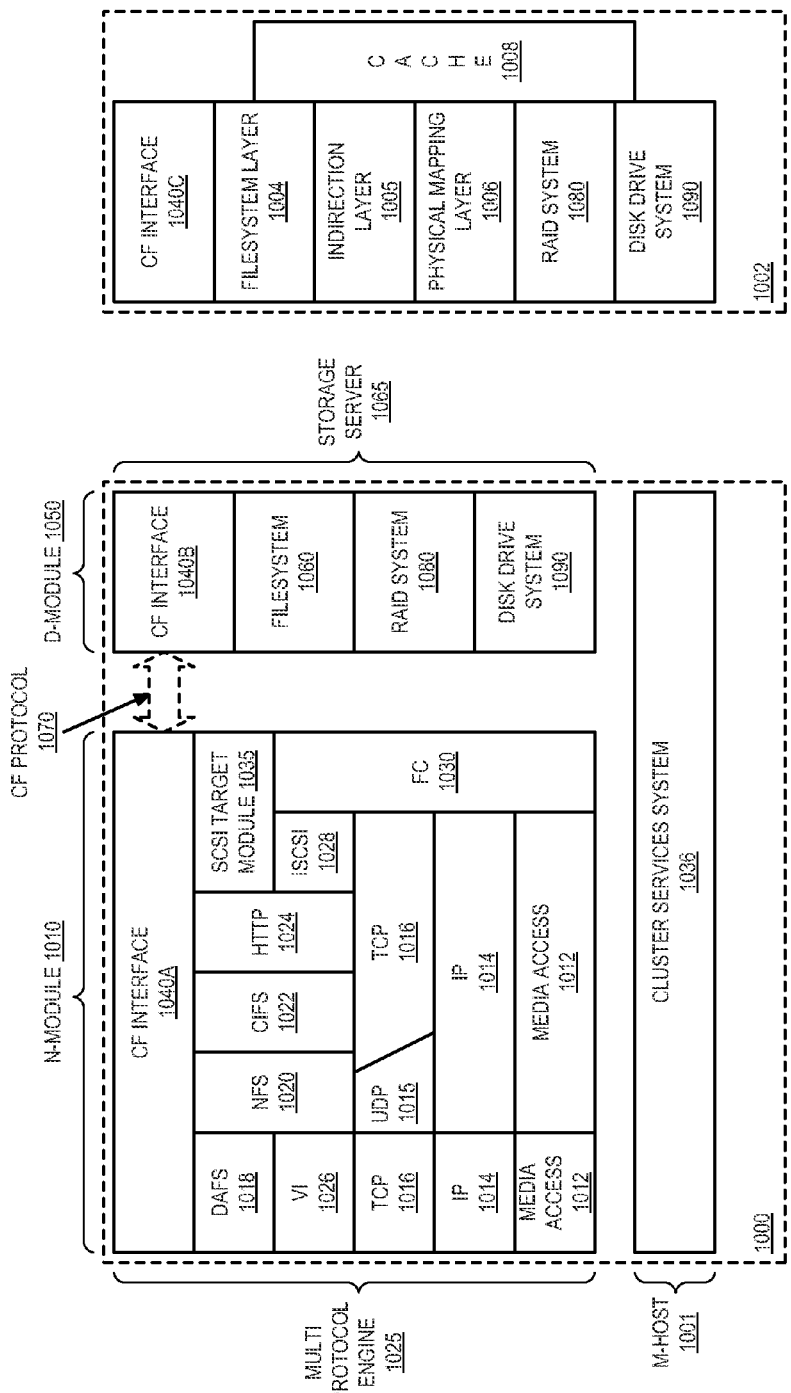
FIG. 10 illustrates an embodiment of the storage operating system of FIG. 9 in parallel with a hierarchically tagged cache operating system.

FIG. 10 is a block diagram of a storage operating system 1000, such as storage operating system 914 of FIG. 9, in which virtual cache appliance management can be implemented. The storage operating system comprises a series of software layers executed by a processor, such as processor 902 of FIG. 9, and organized to form an integrated network protocol stack or, more generally, a multi-protocol engine 1025 that provides data paths for clients to access information stored on the storage server using block and file access protocols.

Multi-protocol engine 1025 includes a media access layer 1012 of network drivers (e.g., gigabit Ethernet drivers) that interface with network protocol layers, such as the IP layer 1014 and its supporting transport mechanisms, the TCP layer 1016 and the User Datagram Protocol (UDP) layer 1015. A file system protocol layer provides multi-protocol file access and, to that end, includes support for the Direct Access File System (DAFS) protocol 1018, the NFS protocol 1020, the CIFS protocol 1022 and the Hypertext Transfer Protocol (HTTP) protocol 1024. A VI (virtual interface) layer 1026 implements the VI architecture to provide direct access transport (DAT) capabilities, such as RDMA, as required by the DAFS protocol 1018. An iSCSI driver layer 1028 provides block protocol access over the TCP/IP network protocol layers, while a FC driver layer 1030 receives and transmits block access requests and responses to and from the storage server. In certain cases, a Fibre Channel over Ethernet (FCoE) layer (not shown) can also be operative in multi-protocol engine 1025 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

The storage operating system also includes a series of software layers organized to form a storage server 1065 that provides data paths for accessing information stored on storage devices. Information can include data received from a client, in addition to data accessed by the storage operating system in support of storage server operations such as program application data or other system data. Preferably, client data can be organized as one or more logical storage objects (e.g., volumes) that comprise a collection of storage devices cooperating to define an overall logical arrangement. In one embodiment, the logical arrangement can involve logical volume block number (vbn) spaces, wherein each volume is associated with a unique vbn.

File system 1060 implements a virtualization system of the storage operating system through the interaction with one or more virtualization modules (illustrated as a SCSI target module 1035). SCSI target module 1035 is generally disposed between drivers 1028, 1030 and file system 1060 to provide a translation layer between the block (lun) space and the file system space, where luns are represented as blocks. In one embodiment, file system 1060 implements a WAFL (write anywhere file layout) file system having an on-disk format representation that is block-based using, e.g., 4 kilobyte (KB) blocks and using a data structure such as index nodes ("inodes") to identify files and file attributes (such as creation time, access permissions, size and block location). File system 1060 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter. A network driver such as layer 1012 or layer 1030 processes the packet and, if appropriate, passes it on to a network protocol and file access layer for additional processing prior to forwarding to file system 1060. There, file system 1060 generates operations to load (retrieve) the requested data from the disks if it is not resident "in core", i.e., in memory 910. If the information is not in memory, file system 1060 accesses the inode file to retrieve a logical vbn and passes a message structure including the logical vbn to the RAID system 1080. There, the logical vbn is mapped to a disk identifier and device block number (disk, dbn) and sent to an appropriate driver of disk driver system 1090. The disk driver accesses the dbn from the specified disk and loads the requested data block(s) in memory for processing by the storage server. Upon completion of the request, the node (and operating system 1000) returns a reply to the client over the network.

It should be noted that the software "path" through the storage operating system layers described above needed to perform data storage access for the client request received at the storage server adaptable to the teachings of the invention can alternatively be implemented in hardware. That is, in an alternate embodiment of the invention, a storage access request data path can be implemented as logic circuitry embodied within a field programmable gate array (FPGA) or an application specific integrated circuit (ASIC). This type of hardware embodiment increases the performance of the storage service provided by the storage server in response to a request issued by a client. Moreover, in another alternate embodiment of the invention, the processing elements of adapters 920, 940 can be configured to offload some or all of the packet processing and storage access operations, respectively, from processor 902, to increase the performance of the storage service provided by the storage server. It is expressly contemplated that the various processes, architectures and procedures described herein can be implemented in hardware, firmware or software.

When implemented in a cluster, data access components of the storage operating system can be embodied as D-module 1050 for accessing data stored on disk. In contrast, multi-protocol engine 1025 can be embodied as N-module 1010 to perform protocol termination with respect to a client issuing incoming access over the network, as well as to redirect the access requests to any other N-module in the cluster. A cluster services system 1036 can further implement an M-host (e.g., M-host 1001) to provide cluster services for generating information sharing operations to present a distributed file system image for the cluster. For instance, media access layer 1012 can send and receive information packets between the various cluster services systems of the nodes to synchronize the replicated databases in each of the nodes.

In addition, a cluster fabric (CF) interface module 1040 (CF interface modules 1040A, 1040B) can facilitate intra-cluster communication between N-module 1010 and D-module 1050 using a CF protocol 1070. For instance, D-module 1050 can expose a CF application programming interface (API) to which N-module 1010 (or another D-module not shown) issues calls. To that end, CF interface module 1040 can be organized as a CF encoder/decoder using local procedure calls (LPCs) and remote procedure calls (RPCs) to communicate a file system command between D-modules residing on the same node and remote nodes, respectively.

In one embodiment, cache access management 1002 is in parallel to storage operating system 1000. In one embodiment, cache access management 1002 includes CF interface 1040C to facilitate inter-cluster communication. Filesystem layer 1004, indirection layer 1005, and physical mapping layer 1006 provide the hierarchical layers for management of the cache. A logical representation of cache 1008 is provided to the side of the layers for reference purposes—a physical cache storing data buffers is not implemented in the control layers of the system. Rather, the cache control is implemented by the layers shown. With the storage operating system 1000, filesystem 1060 directly interfaces with RAID system 1080. In the cache access management 1002, physical mapping layer 1006 directly interfaces with RAID system 1080, which in turn provides access to the disk drive system 1090. The physical cache resources of cache 1008 can be separate from disk drive system 1090.

As used herein, the term "storage operating system" generally refers to the computer-executable code operable on a computer to perform a storage function that manages data access and can implement data access semantics of a general purpose operating system. The storage operating system can also be implemented as a microkernel, an application program operating over a general-purpose operating system, or as a general-purpose operating system with configurable functionality, which is configured for storage applications as described herein.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various operations or functions are described herein, which can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communications interface to send data via the communications interface. A machine readable medium or computer readable medium can cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations without departing from their scope. Therefore, the illustrations and examples herein should be construed in an illustrative, and not a restrictive sense.

What is claimed is:

1. A method for cache management, comprising:
identifying, by a cache device controller, a header of a received data access request as being associated with one of a filesystem layer, a physical mapping layer, or an indirection layer, where each layer is indicated with an indexing structure of headers and the indexing structure of each of the layers is in a cache corresponding to the cache device controller,
wherein the cache device controller manages headers in the cache hierarchically, manages indexes of the physical mapping layer indexing structure to map to physical addresses for data buffers, manages indexes of the indirection layer indexing structure each to map to an index of the physical mapping layer, and manages indexes of the filesystem layer indexing structure each to map to an index of the indirection layer; and
accessing the data buffer when an index includes the header, wherein accessing the data buffer comprises hierarchically traversing the indexes of the layers to a physical address for the data buffer, beginning at the index of the layer identified as being associated with the header, wherein the header comprises metadata when associated with either the filesystem layer or the indirection layer;
when an index does not include the header, creating an entry, for the header, in the indexing structure of the layer identified as being associated with the header;
maintaining a generation count for each data buffer, wherein for each data buffer the generation count is incremented each time the data buffer is evicted from the cache or each time the data buffer is used to hold a different data block; and
maintaining a generation count in each index entry created that references a data buffer, wherein an index entry that has a generation count different from a generation count of the referenced data buffer is evicted.

2. The method of claim 1, wherein each indexing structure includes a separate lookup table, and wherein accessing the data buffer further comprises using an identifier of the header as a key for the lookup table of the index for the layer associated with the header.

3. The method of claim 1, wherein the indirection layer comprises a first indirection layer, and wherein the identifying further comprises:
identifying the header as being associated with one of the filesystem layer, the physical mapping layer, the first indirection layer, or a second indirection layer.

4. The method of claim 1, wherein the cache supports de-duplication of data buffers, where one or more index entries of the indirection layer map to an index entry of the physical mapping layer.

5. The method of claim 1, wherein accessing the data buffer further comprises:
updating information in a header associated with a layer different than the one associated with the header in the received request.

6. The method of claim 1, wherein for a write request, the cache device controller delays mapping of the header to an entry of the index of a different layer to allow allocation of contiguous addresses for the write.

7. A cache system comprising:
a cache storage device to store multiple data buffers; and
a cache controller to,
   manage access to the data buffers of the cache storage device, the cache controller to identify a header indicated in a data access request as being associated with one of a filesystem layer, a physical mapping layer, or an indirection layer, where each layer is indicated with an indexing structure of headers and the indexing structures are in the cache storage device,
   manage the headers hierarchically,
   manage indexes of the physical mapping layer indexing structure to map to physical addresses for data buffers,
   manage indexes of the indirection layer indexing structure each to map to an index of the physical mapping layer, and
   manage indexes of the filesystem layer indexing structure each to map to an index of the indirection layer,
   access a data buffer when one of the indexing structures includes the header, wherein the cache controller to access the data buffer comprises the cache controller to hierarchically traverse the indexes of the layers to a physical address for the data buffer, beginning at the index of the layer identified as being associated with the header, wherein the header comprises metadata when associated with either the filesystem layer or the indirection layer; and
   when an index does not include the header, create an entry, for the header, in the indexing structure of the layer identified as being associated with the header;
   maintain a generation count for each data buffer, wherein for each data buffer the generation count is incremented each time the data buffer is evicted from the cache or each time the data buffer is used to hold a different data block; and
   maintain a generation count in each index entry created that references a data buffer, wherein an index entry that has a generation count different from a generation count of the referenced data buffer is evicted.

8. The system of claim 7, wherein each indexing structure includes a separate lookup table, and wherein to access the data buffer further comprises use of an identifier of the header as a key for the lookup table of the index for the layer associated with the header.

9. The system of claim 7, wherein the indirection layer comprises a first indirection layer, and wherein to identify further comprises the cache controller to identify the header as being associated with one of the filesystem layer, the physical mapping layer, the first indirection layer, or a second indirection layer.

10. The system of claim 7, wherein the cache controller supports de-duplication of data buffers, where one or more index entries of the indirection layer map to an index entry of the physical mapping layer.

11. The system of claim 7, wherein the cache controller to access the data buffer further comprises the cache controller to update information in a header associated with a layer different than the one associated with the header in the data access request.

12. The system of claim 7, wherein for a write request, the cache controller delays mapping of the header to an entry of the index of a different layer to allow allocation of contiguous addresses for the write.

13. A non-transitory computer-readable storage medium having program instructions stored thereon, the program instructions comprising program instructions to:
   identify a header of a received data access request as being associated with one of a filesystem layer, a physical mapping layer, or an indirection layer, where each layer is indicated with an indexing structure of headers and the indexing structure of each of the layers is in a cache of a computing device,
   manage headers in the cache hierarchically, manage indexes of the physical mapping layer indexing structure to map to physical addresses for data buffers, manage indexes of the indirection layer indexing structure each to map to an index of the physical mapping layer, and manage indexes of the filesystem layer indexing structure each to map to an index of the indirection layer;
   access the data buffer when an index includes the header, wherein the program instructions to access the data buffer comprise program instructions to hierarchically traverse the indexes of the layers to a physical address for the data buffer, beginning at the index of the layer identified as being associated with the header, wherein the header comprises metadata when associated with either the filesystem layer or the indirection layer; and
   when an index does not include the header, create an entry, for the header, in the indexing structure of the layer identified as being associated with the header;
   maintain a generation count for each data buffer, wherein for each data buffer the generation count is incremented each time the data buffer is evicted from the cache or each time the data buffer is used to hold a different data block; and
   maintain a generation count in each index entry created that references a data buffer, wherein an index entry that has a generation count different from a generation count of the referenced data buffer is evicted.

14. The non-transitory computer-readable storage medium of claim 13, wherein each indexing structure includes a separate lookup table, and wherein the program instructions to access the data buffer further comprises program instructions to use an identifier of the header as a key for the lookup table of the index for the layer associated with the header.

15. The non-transitory computer-readable storage medium of claim 13, wherein the indirection layer comprises a first indirection layer, and wherein the program instructions to identify comprise program instructions to:
   identify the header as being associated with one of the filesystem layer, the physical mapping layer, the first indirection layer, or a second indirection layer.

16. The non-transitory computer-readable storage medium of claim 13, further comprising program instructions to support de-duplication of data buffers, where one or more index entries of the indirection layer map to an index entry of the physical mapping layer.

17. The non-transitory computer-readable storage medium of claim 13, wherein the program instructions to access the data buffer further comprise program instructions to:
   update information in a header associated with a layer different than the one associated with the header in the received request.

18. The non-transitory computer-readable storage medium of claim 13, wherein the program instructions further comprise program instructions to delay mapping of a header to an entry of the index of a different layer to allow allocation of contiguous addresses for a write request.

* * * * *